United States Patent [19]

Andersson et al.

[11] Patent Number: 4,457,337

[45] Date of Patent: Jul. 3, 1984

[54] DRAIN VALVE, PREFERABLY FOR A VEHICLE BRAKE SYSTEM

[75] Inventors: Sten E. Ö. Andersson, Landkronaä; Nils Å. Nelander, Vintrie, both of Sweden

[73] Assignee: SAB Automotive AB, Landskrona, Sweden

[21] Appl. No.: 361,057

[22] Filed: Mar. 23, 1982

[30] Foreign Application Priority Data

Mar. 27, 1981 [SE] Sweden ................................. 8101975

[51] Int. Cl.³ ............................................. F16K 24/00
[52] U.S. Cl. ................................ 137/614.13; 137/544; 137/588; 251/139; 251/141; 251/144
[58] Field of Search ................... 137/588, 614.13, 544; 251/144, 139, 141

[56] References Cited

U.S. PATENT DOCUMENTS

| 7,885 | 1/1851 | Draner | 137/587 |
|---|---|---|---|
| 977,261 | 11/1910 | Bernstein | 137/588 |
| 2,769,649 | 11/1956 | Scully et al. | 137/587 |
| 3,506,166 | 4/1970 | Pooley | 251/139 |
| 3,633,625 | 1/1972 | Rudel | 137/588 |
| 3,872,953 | 3/1975 | Taylor | 251/139 |
| 4,096,879 | 6/1978 | Serur et al. | 137/391 |
| 4,320,781 | 3/1982 | Bouvet et al. | 251/139 |

FOREIGN PATENT DOCUMENTS

| 33053 | 9/1964 | Fed. Rep. of Germany | 251/139 |
|---|---|---|---|
| 2003258 | 3/1979 | United Kingdom . | |

Primary Examiner—A. Michael Chambers
Attorney, Agent, or Firm—Laurence R. Brown

[57] ABSTRACT

A vehicle brake system drain valve comprises a housing (1–4), a solenoid therein and a valve element (15) movable between two seats (12, 13) in the valve.

A neck (4), which is a part of the housing, is conditionally rotatable relative to the remainder of the housing and has a ventilating channel (20) leading to the atmosphere if not covered by a sealing ring (18).

1 Claim, 1 Drawing Figure

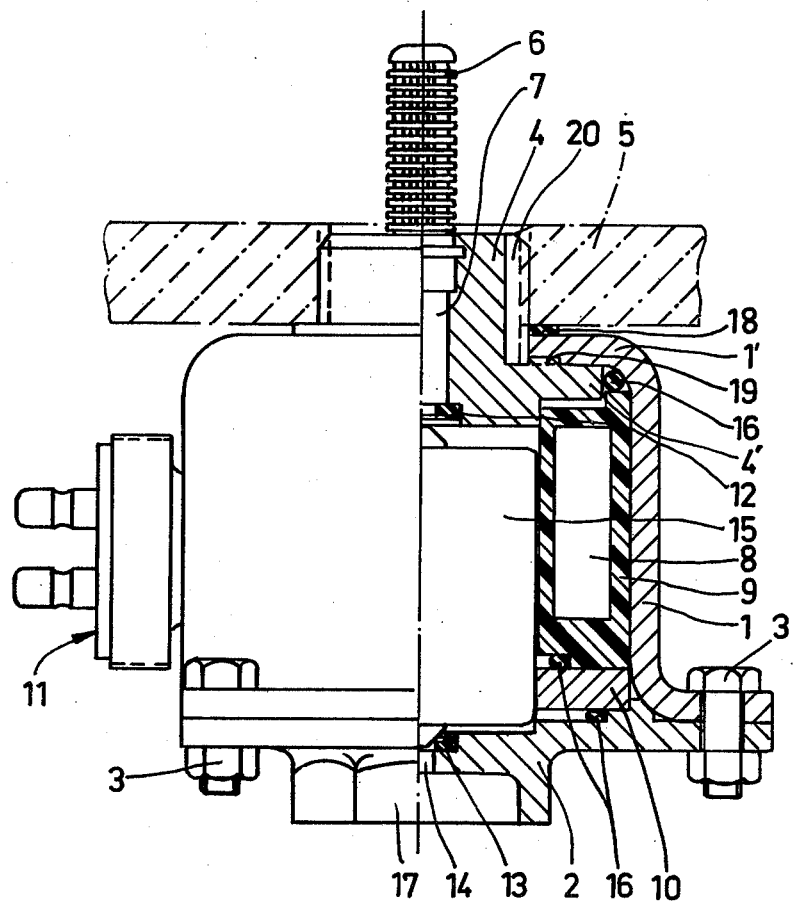

DRAIN VALVE, PREFERABLY FOR A VEHICLE BRAKE SYSTEM

TECHNICAL FIELD

This invention relates to a drain valve attached to a fluid pressure tank to be drained from condensate and comprising a housing, a solenoid therein and a valve element movable under the action of the solenoid between sealing engagements with an upper seat at an inlet from the tank and a lower seat at an outlet to the atmosphere respectively, the condensate having passage past the valve element between the seats.

BACKGROUND ART

A drain valve of this kind is known through Swedish SE No. 407 615 or its German counterpart DE-OS No. 28 37 080. This drain valve has clear advantages over prior known devices but also under certain circumstances a few disadvantages.

One such disadvantage is that it is impossible to obtain a certain orientation of an electric connector means protruding from the housing; such an orientation is often desired and sometimes even imperative.

Another disadvantage is that a ventilation of the tank through the drain valve, which is necessary at certain service works and before a dismounting of the valve, can only be accomplished in that the valve element is manually lifted somewhat by an object inserted through the outlet.

THE INVENTION

The disadvantages mentioned above may be obviated if according to the invention a neck, being a part of the housing, being attached to the tank and containing in the inlet, is conditionally rotatable relative to the remainder of the housing and is provided with a ventilating channel connecting the tank directly with the atmosphere if not covered by a sealing means between the housing and the tank.

In a preferred embodiment, in which the neck has threads for its attachment in a threaded bore in the tank, an inwardly directed flange on a cup of the housing is to be clamped against the tank by an outwardly directed flange on the neck, the two flanges being provided with corresponding heads and notches for their conditional interconnection.

These heads and notches can transfer the necessary torque at mounting and dismounting of the valve but allow relative rotation if not in engagement.

Advantages as regards the handling of the valve at a desired orientation is obtained in that each head of the neck flange has a somewhat smaller angular extension than each cup notch.

Further, in the preferred embodiment the ventilating channel is an axial groove in the exterior of the neck, a sealing ring being provided between the cup flange and the tank.

Normally this sealing ring seals off the ventilating channel completely, but if the drain valve is not firmly attached, air can escape through the channel and past the sealing ring out into the atmosphere.

Although the primary use for a drain valve of the kind described herein is in a vehicle brake system, it is to be understood that the protection is not limited to this use; the advantages with the design are equally valid in any use.

BRIEF DESCRIPTION OF THE DRAWING

The invention will be described in further detail below reference being made to the accompanying drawing showing a drain valve according to the invention, partly sectional.

DESCRIPTION OF A PREFERRED EMBODIMENT

A housing for a drain valve according to the invention consists mainly of three parts: a cup-shaped main part, below called a cup 1, a cover 2 attached thereto by means of screw joints 3, and a neck 4. The neck 4 is provided with external threads for attachment in a threaded bore in a fluid pressure tank 5 to be drained from condensate. This condensate must pass a filter 6, before it can enter an inlet 7 in the neck 4.

A solenoid 8, preferably molded into a cylindrical plastic casing 9, and a ring 10 are arranged in the housing 1–4 as shown. An electric connector means 11 for connecting the solenoid 8 to an electric circuit as will be described below is arranged on the cup 1.

An upper seat 12, preferably of rubber, is arranged around the inlet 7 in the neck 4, and in the same manner a lower seat 13 is arranged in the cover 2 around an outlet 14 leading to the atmosphere.

Axially movable between these two seats 12 and 13 is a valve element or core 15 of a magnetic material and having suitably shaped end parts for sealing cooperation with the respective seat 12 or 13. If the solenoid 8 is excited, the valve element 15 will be lifted into sealing engagement with the upper seat 12, and if not, it will fall down to the shown position in sealing engagement with the lower seat 13 under the action of gravity.

Other possibilities for controlling the movement of the valve member 15 are open: for example a pressure spring may be arranged under the valve member normally to bias it against the upper seat 12, whereas the movement down to the lower seat 13 could be accomplished by a solenoid at a lower location.

Especially under cold conditions it is advantageous to have the drain valve heated to a certain extent all the time so as to avoid freezing of the condensate to be removed. In the practical use of the described drain valve this is accomplished in the following way: The electric connection of the solenoid 8 via the connector means 11 is such that the solenoid is excited all the time during operation, except when the brake pedal or the like on the vehicle on which the drain valve is mounted is depressed closing the brake light circuit. Hereby the valve element 15 normally is kept against the upper seat 12 by the solenoid 8, which is also heated to a certain extent. This heat will spread in the whole drain valve.

The normal operation of the drain valve is thus as follows: Condensate from the tank 5 is accumulated in the inlet 7 above the valve element 15, which is held against the upper seat 12 by the excited solenoid 8. When the vehicle brakes are operated, this condensate trickles down past the valve element 15, which is now in the position shown in the drawing. After the completion of the brake operation the valve element 15 is again lifted by the solenoid 8 to the upper seat 12, leaving the condensate free way out from the valve through the outlet 14. It is to be observed that at this whole operation practically no air from the tank 5 can escape to the atmosphere.

For the sake of completeness it can be added that three sealing rings 16 are arranged as shown at the solenoid casing 9 and the ring 10. Also, the cover 2 is provided with a tool grip 17 around the outlet 14 for the mounting and dismounting of the drain valve.

In many cases it is important to have the electric connector means 11 oriented in a certain direction after the mounting of the drain valve in its corresponding threaded hole in the tank 5. In the present case this may be accomplished in the following way.

The neck 4 is provided with an outwardly directed flange 4', whereas the cup 1 is provided with an inwardly directed flange 1', which at the mounting of the drain valve will be clamped against the tank 5 by the neck flange 4'; a sealing ring 18 is normally provided around the neck 4 between the cup flange 1' and the tank 5.

It is obvious that in this way the cup 1 is rotatable as desired relative to the neck 4, provided that the clamping force is not too great. However, both at the mounting and a possible later dismounting a torque must be transmitted between the cup 1 and the neck 4, as the tool grip 17 on the cover 2 must be used at the mounting and dismounting of the valve. For this reason the cooperating surfaces on the flanges 1' and 4' are provided with corresponding heads and notches 19. Relative rotation may therefore only occur in a position where there is a certain axial clearance between the cup and the neck, or in other words before the valve is too tightly attached in its threaded hole in the tank 5.

It is of advantage as regards the handling of the valve and the possibility to obtain relative rotation if the heads on the neck flange have a somewhat smaller angular extension than the cup notches.

The number of corresponding heads and notches 19 depends partly on the desired precision in the orientation of the connector means 11.

In some instances, for example at service works or at a possible replacement of the drain valve, it may be necessary to ventilate the tank 5 in order to decrease the pressure therein to atmospheric. This may be accomplished by manually lifting the valve element 15 somewhat from its lower seat 13 through the outlet 14.

A far better solution is to provide the neck 4 with a ventilating channel 20, preferably as shown axially in the exterior surface of the neck 4. With the valve firmly mounted to the tank as shown the channel 20 is covered by the sealing ring 18, whereas the air in the tank 5 may be ventilated through the channel 20 and past the sealing ring 18, if the valve is loosened somewhat from the tank 5 by turning the valve in the proper direction.

Modifications are possible within the scope of the appended claims.

We claim:

1. In a drain valve screwed into the bottom of a tank for draining condensate from said tank with means connected to electrical terminals for electrically heating the valve to avoid freezing of the condensate from a normally energized solenoid operating to hold a valve seat into sealing engagement in an upper seat extending into the tank through a threaded bore thereby preventing escape of contents from the tank and operating upon deenergization to move the valve to a lower seat coupled for draining condensate, the improvement comprising, a rotatable housing comprising a neck defining said upper seat with threads mating into said bore and a housing member carrying said electrical terminals and solenoid relatively rotatable on said neck, a draining channel axially extending through the mating threads from the atmosphere into the tank and sealing means closing and opening said channel in response to rotation of the housing member on said neck in opposite directions, whereby the housing and its electrical terminals may be aligned and the tank may be emptied through said channel by rotation of said housing member on said neck a partial turn.

* * * * *